United States Patent [19]

Krieger et al.

[11] Patent Number: 4,502,245

[45] Date of Patent: Mar. 5, 1985

[54] MEANS FOR CONTROLLING PIVOTAL DOORS IN NUCLEAR PLANTS

[75] Inventors: Friedrich Krieger, Würzburg; Norbert Klemm, Giebelstadt, both of Fed. Rep. of Germany

[73] Assignee: Gg. Noell GmbH, Würzburg, Fed. Rep. of Germany

[21] Appl. No.: 264,890

[22] Filed: May 18, 1981

[51] Int. Cl.³ ............................................ E05D 15/50
[52] U.S. Cl. ........................................................ 49/193
[58] Field of Search ..................... 49/193, 68; 137/269; 16/231

[56] References Cited

U.S. PATENT DOCUMENTS

| | | | |
|---|---|---|---|
| 707,910 | 8/1902 | Fischer et al. | 49/193 X |
| 1,550,205 | 8/1925 | Cemazar | 49/193 X |
| 1,560,537 | 11/1925 | Cole | 49/193 X |
| 2,317,798 | 4/1943 | Otto | 49/68 X |
| 2,357,397 | 9/1944 | Fuller | 49/193 X |
| 4,222,149 | 9/1980 | Holbek | 49/193 X |

Primary Examiner—Philip C. Kannan
Attorney, Agent, or Firm—Horst M. Kasper

[57] ABSTRACT

Means for controlling pivotal doors in nuclear plants, more specifically to control doors separating storage basins for nuclear materials. Instead of providing the control means on the wall structure of juxtaposed door openings, the control means are mounted on the door panels. They include a pair of fluid-operated cylinder-and-piston motors, the direction of operation of the pistons being parallel to an edge of the door panel. The cylinder-and-piston motors are preferably mounted on an edge of the door panel. Each motor operates a linkage that includes two rods, of which one is raised when the other is lowered. One of the two rods controls abutment means precluding the door from pivoting about one of its edges, and allowing the door to pivot only about the other of its edges. The other of the two rods controls latching means which, in one position thereof firmly clamp the door panel against the cooperating door opening to exert a sealing effect and which, in the other position thereof, frees the door panel and terminates the sealing effect.

10 Claims, 5 Drawing Figures

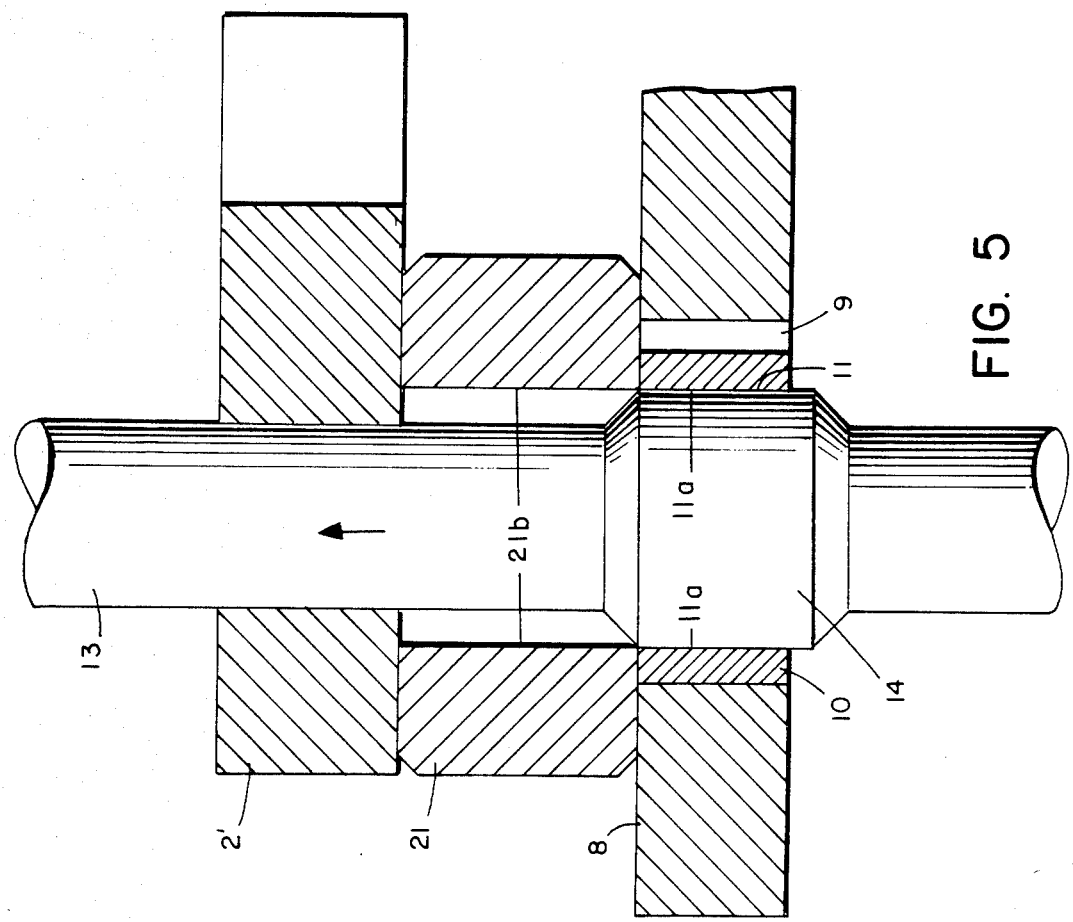
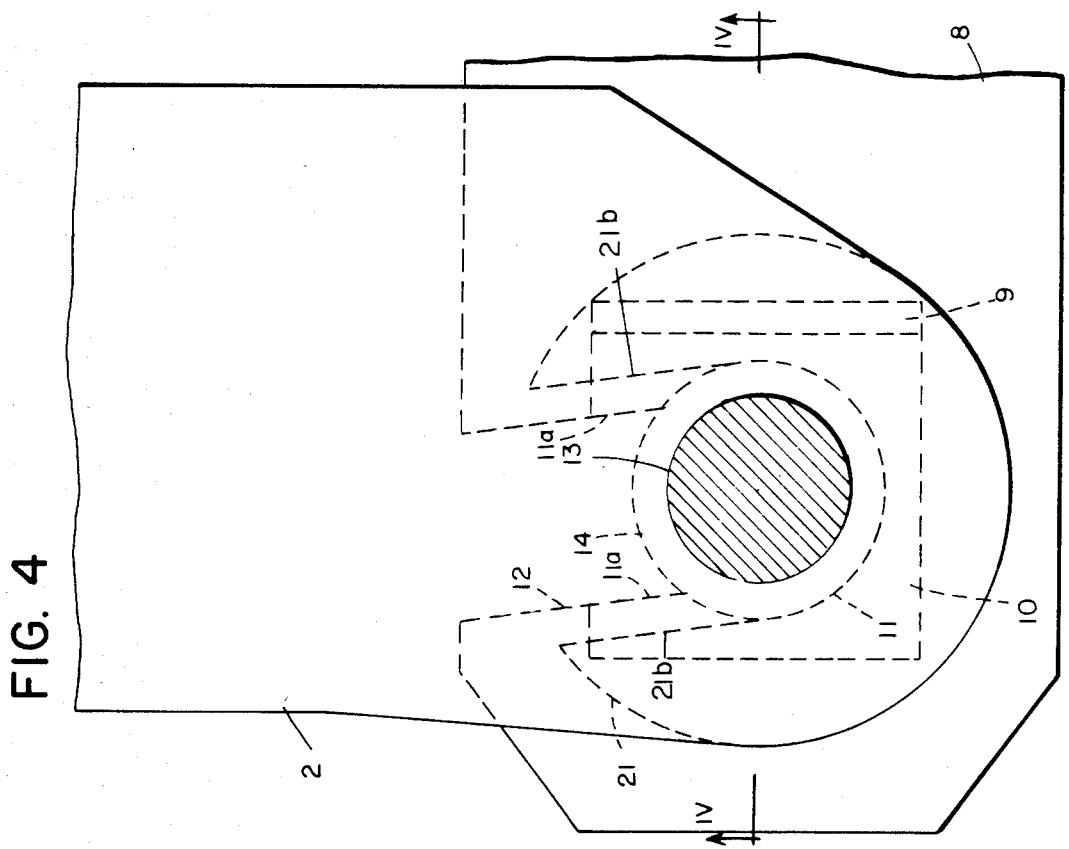

MEANS FOR CONTROLLING PIVOTAL DOORS IN NUCLEAR PLANTS

BACKGROUND OF THE INVENTION

This invention relates to pivotal doors for alternatively closing and opening a pair of juxtaposed door openings in basins for storing fuel elements in nuclear plants. To be more specific, this invention relates to means for locking and unlocking, or latching and unlatching, such doors in either of their two positions.

In prior art mechanisms of the above description the mechanical means for locking and unlocking the doors and rendering their hinges effective and ineffective were secured to the walls of the basin and included inter alia several separate fluid operated cylinder and piston motors.

These prior art arrangements have several serious drawbacks. They are relatively bulky, difficult to repair and not cost-effective.

Objects of the invention are, therefore, to decrease the bulk of such mechanisms, to facilitate their repair, and to render them more cost-effective.

Other objects of the invention and advantages thereof will become more apparent as this specification proceeds.

SUMMARY OF THE INVENTION

According to this invention the means for performing the functions of pivoting a door selectively about opposite sides thereof and selectively latching said door in either of the two positions thereof are performed by a pair of fluid operated cylinder-piston motors of which both are supported by said door and of which each operates a linkage.

The fluid operated cylinder-piston motors and at least a part of the linkage operated by them are preferably mounted on, and supported by, an edge of said door.

BRIEF DESCRIPTION OF THE DRAWINGS

FIG. 4 shows a cross-section of the abutment mechanism shown more diagrammatically in elevation in FIG. 2; and FIG. 5 is a section of the abutment mechanism of FIG. 4 taken along IV—IV of FIG. 4.

DESCRIPTION OF PREFERRED EMBODIMENT

Figures 1, 2, 3:
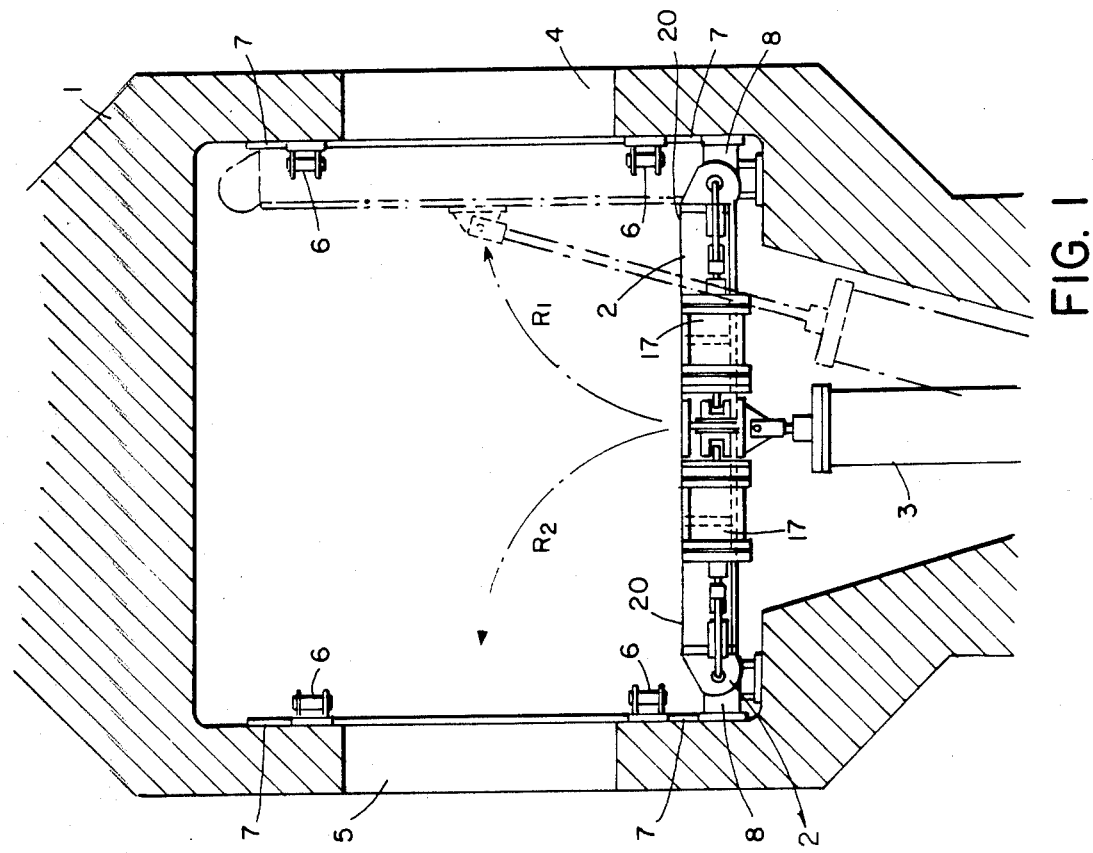
FIG. 1 is a top plan view of the partition between the basins, the pivotal door being shown in the position to allow both basins to communicate, and FIG. 1 further indicates in dash-and-dot lines the position of the door when it closes the right door opening.
FIG. 2 is a front view of the door panel and the operating mechanisms thereof, i.e. its mechanism for allowing and precluding pivotal movements of the door in a given direction and its means for latching the door panel under pressure against the door opening and for unlatching the door from that position.
FIG. 3 is a section of the structure shown in FIG. 2 taken along III—III of FIG. 2.

Referring now to the drawings, numeral 1 has been applied to designate a partition separating two basins for storing nuclear fuel elements. Partition 1 includes two openings 4 and 5 through which the two above referred-to basins are allowed, or not allowed, to communicate. This depends on the position of a door to which reference numeral 2 has been applied. The operation of door 2 is effected by rods of a cylinder and piston motor 3. In the position of door 2 shown in FIG. 1 both openings 4 and 5 are unobstructed by door 2 and both above referred-to basins may communicate. In the position of cylinder and piston motor 3 and door 2 shown in dash-and-dot lines in FIG. 1, opening 4 in partition 1 is obstructed by door or panel 2, thus precluding communication of the basins to the left and to the right of partition 1. Door 2 is selectively pivotable about a right pivot—to be later described in greater detail—resulting in the position of door 2 shown in dash-and dot lines in FIG. 1. As an alternative, door or panel 2 may be pivoted about a left pivot resulting in closing of opening 5. Door 2 is latched in both positions closing either opening 4 or opening 5 by fixed latching members to which reference character 6 has been applied. Latching members 6 are short bolts or rollers positioned adjacent door openings 4 and 5 on the stationary partition structure defining door openings 4 and 5. Reference numeral 7 has been applied to strips of sealing material which frame both door openings 4 and 5 and cooperate with sealing means 20 on the surface of door or panel 2 to establish water tightness.

A pair of fluid operated cylinder-and-piston motors 17 is supported by door or panel 2. Motors 17 are arranged in such a way that the direction of operation of motors 17, or their pistons, is parallel to one of the edge sides of panel or door 2. Preferably motors 17 are mounted on an edge of panel or door 2. The control structure of door 2 further includes a pair of pivotally supported plate members 16 of which each is arranged to be pivoted by one of said motors 17. The points where plate members 16 are pivotally supported have been designated by reference character 16a. Plate members 16 are preferably mounted on the same edge of door 2 as each motor 17. Plate members 16 each have a first arm by which rods 13 are hingedly supported and each plate member 16 has a second arm which is angularly displaced from said first arm and supports rods 15. Rods 13 and 15 extend generally parallel to the plane of door or panel 2 and have two limit positions for selectively establishing and disabling a pair of abutments determining the direction of the pivotal movement of panel or door 2. The preferred form of these abutments is described below in detail. Each rod 15 is provided with a pair of nose-shaped latching members or hooks 19 adapted to cooperate with latching members 6. Hooks 19 may cooperate with latching members 6 to latch door 2 in position, or may disengage from latching members 6 to allow door or panel 2 to be moved to another of its two positions which control openings 4 and 5. As mentioned above, in each of said two positions the sealing strips 7 arranged around the opening to be closed, are engaged under pressure by cooperating strips 20 on door 2.

Panel or door 2 has two positions in one of which it closes opening 4, and in the other of which it closes opening 5. To close opening 4, door 2 must be pivoted about a pivot at its right lower corner to the position shown in dash-and-dot lines in FIG. 1. On the other hand, to close opening 5, door 2 must be pivoted about a pivot at its left lower corner.

The first mentioned pivotal movement of door 2 has been indicated by an arrow $R_1$ and the last mentioned pivotal movement of door 2 has been indicated by an arrow $R_2$. To achieve this end, selective abutment mechanisms must be provided which determine the direction of the pivotal movement of door 2, i.e.

whether door 2 is to be rotated in clockwise direction as shown to the right of FIG. 1, or in counterclockwise direction, as indicated by arrow $R_2$ to the left of FIG. 1.

A preferred embodiment of an abutment mechanism for the change of the direction of door rotation is shown in detail in FIGS. 4 and 5.

Reference numeral 13 has been applied in FIGS. 4 and 5 to indicate one of the rods shown in FIG. 2 in elevation. Rods 13 project at right angles through bearing plates 8 (shown in top-plan view in FIG. 1 and in elevation in FIG. 2). Bearing plates 8 are affixed to the partition structure 1, i.e. are fixed and do not form part of the movable door 2, and of its movable control means 17,16,15, etc. FIGS. 4 and 5 show the abutment mechanism that is also illustrated in FIG. 2.

The abutment mechanisms at the right and left sides of door 2 are mirror images of each other.

As shown in FIGS. 4 and 5, each bearing plate 8 has a rectangular recess 9 in which an element 10 is slidably arranged. Element 10 is provided with an aperture 11 of which a portion is circular and of which an extension is straight and bounded by parallel walls 11a. The slot in part 10 formed by walls 11a finds its continuation by a slot 12 in bearing plate 8.

Rod 13 has a point of predetermined diameter 14 which is larger than the diameter of rod 13.

In the abutment position of portion 14 of rod 13 of increased diameter, portion 14 cannot leave plates 10 and 8 because the passageway or slot bounded by surfaces 11a and the passageway 12 are too narrow. The outer diameter of thickened portion 14 of rod 13 is substantially wider than the width of the slots bounded by surfaces 11a and thus portion 14 cannot pass through it. Spacers 21 are superimposed upon bearing plates 8, as shown in FIGS. 2, 4 and 5. Spacers 21 are slotted. The boundary walls of the slot in spacers 21 have been designated by reference character 21b. The slots bounded by each of walls 21b form an extension of the slots in parts 10 and 8, though their diameter is much larger than the slots in parts 10 and 8, namely substantially equal to the diameter of point 14 of enlarged width of rod 13. Thus, when rods 13 are in their lower limit positions, parts 14 prevent rods 13 from moving through the slots bounded by surfaces 11a and slots 12. When rods 13 are in their upper limit positions, parts 14 thereof may move through slots 21b in part 21, while the part of small diameter of rod 13 may move through slots in parts 10 and 8. The lower ends of rods 13 are inserted into bearings 18 and thus normally held in fixed position.

A prerequisite of pivoting door 2 in either direction is to draw one of rods 13 out of its bearing 18 which is effected by either of motors 17. This motion of either of rods 13 causes the points 14 of increased diameter of rods 13 to move from their abutment position into the spacing members 21. This, in turn, allows one of rods 13 to pass through the slots in parts 10,8 and 21 and to allow rotation of door 2 about the other rod 13.

Referring to FIG. 2, if right rod 13 is lifted by right motor 17, door 2 may pivot about left rod 13, and vice versa. In the position of rods 13 shown in FIG. 2, both rods 13 are shown in their respective positions preventing any pivotal movement of door 2. Door 2 is provided with means such as parts 2' shown in FIGS. 2 and 5 preventing door 2 from separating from either of rods 13, and to pivot about the other of rods 13 held by bearing plate 8 and bearing 18.

When door 2 is in either of its two positions closing openings 4 or 5, either of rods 15 is lowered as the rod 13 pivotally suspended from the same plate 16 is raised. This causes engagement of latching hooks 19 with latching members 6 on supporting structure 1 or, in other words, hooks 19 penetrate behind latching bolts, or latching members 6. Simultaneously, one of parts 10 moves toward the wall defining openings 4 or, respectively 5, depending on which of them is to be closed, and the fixed sealing strips 7 are engaged under pressure by cooperating rubber seals 20 on door 2.

The above referred-to abutment mechanism may also be described in other terms as follows: It includes relatively narrow slots 11, 11a and 12 extending in a direction substantially transversely to each said first rods 13. Said slots are defined by structures 10 and 8 closely surrounding rods 13. It further includes relatively wide slots 21b extending in a direction substantially transversely to each of said first rods 13 and defined by structures 21 surrounding an area 14 of increased size of rod 13. Said relatively narrow slots 11,11a,12 and said relatively wide slots 21b are spaced from each other in a direction longitudinally of rods 13 and are arranged in registry inasmuch as their length is equal. Rods 13 are circular in cross-section and point or thickening 14 is of increased diameter. If area 14 is disposed above slots 21b, the movement of all portions of rods 13 through their transverse slots 11,11a,12 and 21b is not inhibited. When the area or portion of increased diameter 14 is out of registry with slot 21b of relatively wide diameter, the movement of any of the portions of rods 13 is inhibited, i.e. rod 13 and its portion 14 of increased diameter cannot pass through any of slots 11,11a,12 and 21b.

We claim as our invention:

1. A pivotal door for alternatively closing and opening a pair of oppositely disposed door openings in basins for storing fuel elements in nuclear plants, comprising
a pair of oppositely disposed door openings;
a rectangular panel adapted to selectively close one and leave open the other of said pair of oppositely disposed door openings and provided with wide surface sides and narrow edge sides;
a pair of fluid operated cylinder-piston motors supported by said panel and arranged on said panel in such a way that the direction of operation of said pair of cylinder-piston motors is parallel to one of said narrow edge sides of said panel;
a pair of plates pivotally mounted on the rectangular panel each arranged to be pivoted by one of said pair of cylinder-piston motors, said pair of plates each comprising a first arm and said pair of plates each comprising a second arm angularly displaced from said first arm so that when said first arms are raised or, respectively, lowered said second arms are lowered or, respectively, raised;
two first rods extending parallel to the general plane of said panel and pivotally supported by each respective first arm and having two limiting positions;
a pair of abutment means affixed to the stationary structure defining a respective door opening and cooperating with each first rod for selectively enabling said panel to pivot and disabling said panel from pivoting around one of the narrow edge sides thereof;
fixed latching means disposed adjacent to each of said door openings and affixed to the stationary structure defining each of said pair of door openings;
two second rods extending parallel to the general plane of said panel and pivotally supported by a corresponding second arm and having two limit positions; and two movable latching means each provided to a corresponding second rod and capable of cooperating with said fixed latching means for selectively enabling and disabling said fixed latching means and said movable latching means to engage each other.

2. The pivotal door according to claim 1 wherein said pair of fluid operated cylinder-piston motors and said pair of pivotally supported plate members are arranged on and supported by an edge of said panel.

3. A pivotal door structure for alternatively opening one and closing the other of a pair of oppositely disposed door openings in basins of nuclear plants for storing fuel elements comprising
   (a) a substantially rectangular door panel adapted to be pivoted selectively around an axis close and parallel to one of opposite edges of the door panel;
   (b) a pair of fluid operated cylinder-piston motors supported by said panel and operating in a direction at right angles to said opposite edges thereof;
   (c) a pair of members pivotally mounted on the rectangular door panel each having an end connected to a respective one of said pair of cylinder-piston motors;
   (d) a pair of first rods each having its axis disposed in a plane about parallel to the plane of the door panel and being supported by the door panel;
   (e) a pair of second rods each having its axis disposed about in a plane parallel to the plane of the door panel and being supported by the door panel, and said first rod and said second rod being coordinated to move simultaneously in opposite directions;
   (f) first rod engaging abutments affixed to a stationary structure defining a respective door opening for selectively allowing and disallowing movement of said panel transversely to said first rod axis direction; and
   (g) second rod engaging clamping means disposed adjacent to each of said door openings for selectively allowing and disallowing clamping of said panel against one of said door openings 4. A pivotal door as specified in claim 3 wherein said abutments include
   (a) a structure closely surrounding said first rod and having relatively narrow slots extending in a direction substantially transversely to said first rod;
   (b) a structure closely surrounding said first rod and having a relatively wide slot extending in a direction substantially transversely to said first rod;
   (c) said relatively narrow slot and said relatively wide slot being spaced from each other in a direction longitudinally of said first rod;
   (d) said relatively narrow slot and said relatively wide slot being arranged in registry to the extent they overlap;
   (e) said first rod being circular in cross-section and including a point of increased diameter; and
   (f) said point of increased diameter when juxtaposed to said relatively wide slot allowing movement of said point of increased diameter through said relatively wide slot and movement of the other portions of said first rod through said relatively narrow slot and said point of increased diameter when out of registry with said relatively wide slot precluding any movement of said first rod through either of said relatively wide or said relatively narrow slots.

5. A hinged door closure provision comprising
   a door frame;
   a door panel matching the door frame;
   a pair of fluid-operated cylinder-piston motors supported by the door panel;
   a pair of pivotable members supported by the door panel and each having one end connected to the piston of a respective motor;
   a first pair of hinge rods with each rod coordinated to one of the lateral edges of the door panel and attached to a second end of a respective pivotable member;
   a protrusion disposed at the hinge rod; and
   a locking abutment disposed at the door frame for providing a first position where the protrusion locks the axis of the hinge rod to a fixed axial position and a second axial position where the hinge rod can disengage from the door frame.

6. The hinged door closure provision according to claim 5 wherein the pair of fluid operated cylinder piston motors are mounted on an edge of the door panel.

7. The hinged door closure provision according to claim 5 wherein the respective hinge rod is moved by the pivotable member in a direction along the axis of the respective hinge rod.

8. The hinged door closure provision according to claim 5 further comprising
   a second pair of rods each attached to a respective pivotable member and movable in a direction parallel to its axis.

9. The hinged door closure provision according to claim 5 further comprising
   a total of two door openings each coordinated to a respective one of the first pair of hinge rods.

10. The hinged door closure provision according to claim 9 further comprising
    latching means disposed at respective door opening edges each cooperating with a respective one of said second rods to press said door against the respective door opening in one of two door closing positions of the door to which the door panel may be pivoted.

* * * * *